J. H. NEDER.
SHOCK ABSORBER.
APPLICATION FILED JUNE 10, 1913.
1,086,929.
Patented Feb. 10, 1914.
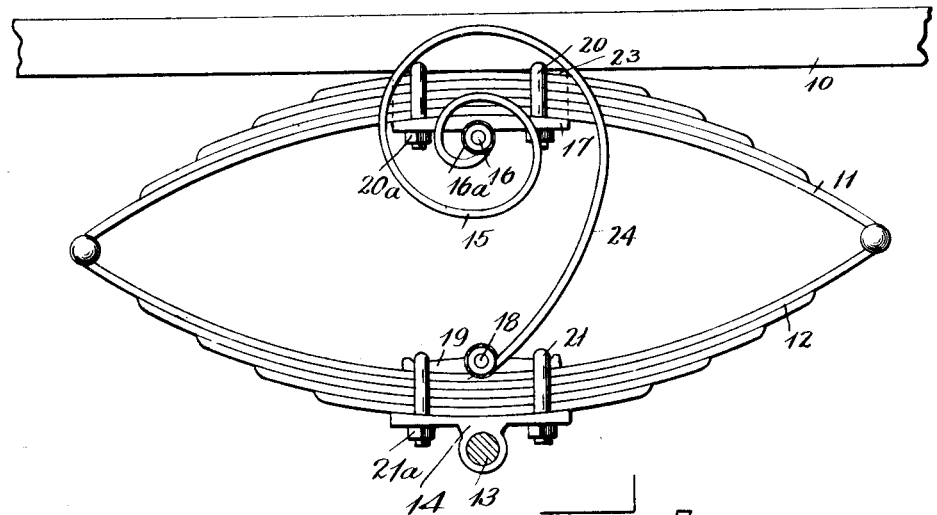
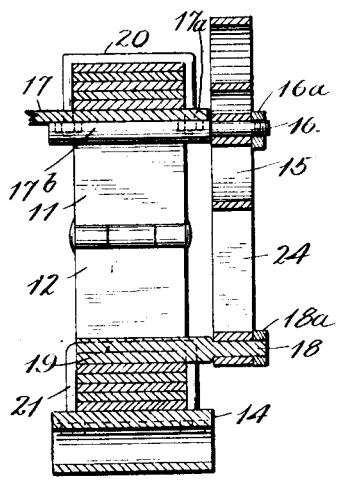
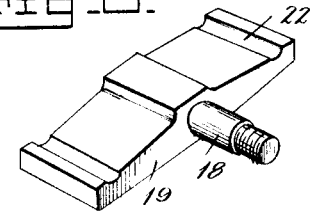
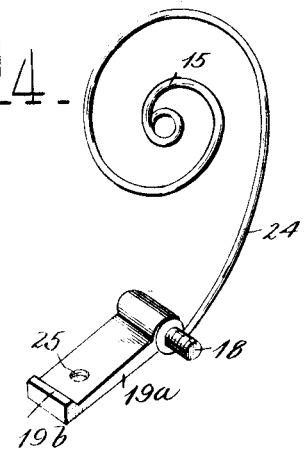
WITNESSES
INVENTOR
John H Neder
BY
ATTORNEYS

UNITED STATES PATENT OFFICE.

JOHN HENRY NEDER, OF BAKER, OREGON.

SHOCK-ABSORBER.

1,086,929.  Specification of Letters Patent.  Patented Feb. 10, 1914.

Application filed June 10, 1913. Serial No. 772,770.

*To all whom it may concern:*

Be it known that I, JOHN H. NEDER, a citizen of the United States, and a resident of Baker city, in the county of Baker and State of Oregon, have invented a new and Improved Shock-Absorber, of which the following is a full, clear, and exact description.

An object of my invention is to provide a shock absorber to protect the arched springs of a vehicle from breakage due to the sudden rebound of the springs as the vehicle passes over an obstruction or rough ground.

A further object of the invention is to provide a shock absorber in the form of a helical spring readily attachable to the arched springs of the vehicle, and which shall be neat in appearance, noiseless and involve a minimum cost of manufacture.

The invention will be particularly explained in the specific description following.

Reference is to be had to the accompanying drawings, forming a part of this specification, in which similar characters of reference indicate corresponding parts in all the views, and in which—

Figure 1 is a side elevation of my improved shock absorber, applied to an elliptical spring; Fig. 2 is a transverse vertical section; Fig. 3 is a perspective view of the lower clip plate for securing the helical spring; and Fig. 4 is a perspective view, illustrating a modification.

In the illustrated example, the numeral 10 indicates a fragment of the vehicle frame or chassis; 11 and 12 upper and lower members of an elliptical spring; and 13 the vehicle axle, there being shown a known form of seat 14, carried by the axle for receiving the lower member 12 of the elliptical spring.

In connection with an elliptical or other like form of arched spring, I employ a helical spring 15, connected at one end to a stud 16 which projects outwardly from a clip plate 17 at the outer side of the latter, said stud receiving a nut 16ᵃ. The lower end of the helical spring is secured to a similar stud 18, projecting laterally from the outer side of a lower clip plate 19, the clip plates having curved surfaces to seat against the respective member of the elliptical spring. The upper clip plate is clamped to the upper member 11 of the elliptical spring by clip bolts 20, which pass through openings 17ᵃ in said clip plate. The lower clip plate 19 is secured by clip bolts 21 and have transverse grooves 21 near the ends thereof, in which the U-bends of the clip bolts are received, the ends of said bolts passing through the seat 14. The upper clip plate 17 may be secured to the chassis in any suitable manner, being shown in Fig. 1 as continued downwardly as at 23, and in practice may have the conventional formation of similar spring-supporting means in automobile construction. As seen in Fig. 2, the upper clip plate 17 is of increased thickness at the center as at 17ᵇ to provide the necessary material and the strength in line with the stud 16.

The spring 15 has its convolutions about the stud 16 as a center and the outer convolution is continued in the form of a curved arm 24 extending downwardly to the stud 18, the curvature of said arm 24 increasing in degree toward stud 18, the arrangement being such that a relative movement of the upper and lower members 11 and 12 of the elliptical spring will cause the arm 24 to lengthen or shorten to accord with the movements of the elliptical spring.

In the form shown in Fig. 4 the helical spring 15 is secured at its upper end, as in Fig. 1, the arm 24, however, being secured to stud 18ᵃ, formed at one end of a lower clip plate 19ᵃ which may have a hole 25 for receiving a bolt or set screw to be passed through the laminations of the lower member of the elliptical spring into the seat 14 or its equivalent and said plate may also have a rib 19ᵇ at the end opposite the stud 18ᵃ, to be engaged by a clip bolt such as is employed with the plate 19.

It will be apparent that the attachment can be produced at low cost and may be readily applied to known forms of springs and other conventional appurtenances of an automobile or other vehicle.

Having thus described my invention I claim as new and desire to secure by Letters Patent:—

1. A shock absorber adapted for attachment to arched vehicle springs, comprising a helical spring, upper and lower clip plates to secure the opposite ends of the helical spring, and means to secure said clip plates to relatively movable parts of the vehicle; each clip plate having an outwardly projecting stud at the outer side thereof to which the respective ends of the helical spring are secured, said helical spring having its convolutions about one of said studs at the center and having its outer convolution terminating in a curved arm connected with the stud of the other clip plate.

2. A shock absorber adapted for attachment to arched springs of vehicles, comprising a helical spring, upper and lower clip plates to secure the opposite ends of the helical spring, clips to secure said plates to relatively movable parts of the vehicle, each clip plate having an outwardly projecting stud at its outer side, to which the respective ends of the helical spring are secured, said helical spring having its convolutions about the upper stud as a center and having its outer convolution terminating in a curved arm, extending through the stud of the lower plate, the said lower plate having transverse grooves near the ends to receive the clip bolts.

3. A shock absorber for attachment to elliptical vehicle-springs, comprising an upper clip plate, having a curved side to seat upon a curved surface of the upper member of an elliptical spring, a lower clip plate having a curved surface to seat on the lower member of the elliptical spring, each clip plate having a stud at its outer side projecting outwardly therefrom at about the center, the upper clip plate having holes and the lower clip plate having transverse grooves near the ends, clip bolts adapted to pass through the holes of the upper clip plate, and clip bolts to be received in the grooves of the lower clip plate, and a helical spring secured at one end to the upper stud and having convolutions about the said stud, the opposite end of the helical spring being in the form of a curved arm, the curve of which increases in degree toward the lower end, the said lower end being secured to the lower stud.

In testimony whereof I have signed my name to this specification in the presence of two subscribing witnesses.

JOHN HENRY NEDER.

Witnesses:
   CHAS. H. McCOLLOCH,
   C. C. McCOLLOCH.

---

Copies of this patent may be obtained for five cents each, by addressing the "Commissioner of Patents, Washington, D. C."